United States Patent [19]

Coia

[11] 3,747,083

[45] July 17, 1973

[54] TELEMETRIC RECEIVER

[75] Inventor: Pasco A. Coia, Providence, R.I.

[73] Assignee: General Signal Corporation, Providence, R.I.

[22] Filed: Nov. 16, 1971

[21] Appl. No.: 199,178

[52] U.S. Cl. .................. 340/206, 328/48, 340/178, 340/187
[51] Int. Cl. ............................................. G08c 19/22
[58] Field of Search ..................................... 340/206

[56] References Cited
UNITED STATES PATENTS

| | | | |
|---|---|---|---|
| 2,680,241 | 6/1954 | Gridley | 340/206 |
| 3,097,340 | 7/1963 | Dobbie | 340/206 |
| 3,189,881 | 6/1965 | Reinhart | 340/206 |

Primary Examiner—Thomas B. Habecker
Attorney—George Vande Sande, Harold S. Wynn and Jefferey S. Mednick

[57] ABSTRACT

The disclosure concerns a telemetric receiver for pulse width modulated signals. The receiver processes the transmitted signal by transducing it into a series of clock pulses, counting the pulses in the binary number system, then transferring the count to a memory register, and finally converting the stored count into an analog current which develops an input for a DC positioner which actuates a readout element. Preferably, the transmitted signal is introduced through a line isolation relay, and the receiver includes apparatus for retransmitting the incoming signal, and a signal loss detector which sets the analog current to a prescribed level whenever the transmission lines are shorted or broken or the duration of the transmitted signal is intentionally reduced to zero.

17 Claims, 7 Drawing Figures

TELEMETRIC RECEIVER

BACKGROUND AND SUMMARY OF THE INVENTION

At the present time, many commercial telemeter systems which convey information via cyclic, time duration or pulse width modulated signals employ electromechanical receivers of the general type described in U.S. Pat. No. 2,145,026, granted Jan. 24, 1939. In this kind of receiver, the readout element is positioned by a pair of mechanical actuators which are driven in opposite directions through alternately engaged clutches during the on and off portions, respectively, of each transmitter cycle. Inasmuch as both clutches must be engaged and disengaged, and each actuator must be moved, during each transmitter cycle regardless of whether or not there has been a change in the transmitted information, the wearing parts of the instrument deteriorate rapidly. As a result, the receiver requires regular, frequent servicing.

The object of this invention is to provide a practical telemetric receiver which is free of the maintenance problems which plague prior receivers of the kind just mentioned. According to the invention, the incoming signal is transduced electronically to digital form by selectively gating into a binary counter a number of clock pulses which corresponds to the width of the transmitted pulse. At the end of the transmitted signal, the count is transferred to a binary memory register, the counter is reset to zero, and an electronic digital-to-analog converter transduces the stored count into an electric current whose magnitude is proportional to the count. The current is used to develop a control voltage which serves as the input to a DC servomechanism which positions the readout element of the receiver. Although the counter is energized each time a signal is transmitted, the count stored in the register changes only when a change occurs in the transmitted information (i.e., the duration or width of the received pulse). Because of this, the servo motor and the readout element it drives move only when necessary, and consequently wear and maintenance are minimized.

In addition to the main advantage of minimizing maintenance, the preferred embodiment also incorporates the following desirable features:

1. The transmitted signal is introduced into the receiver through a line isolation relay which protects the electronic circuitry from line voltage surges attributable, for example, to lightning.
2. A signal loss detector automatically overrides the digital-to-analog converter and reduces analog current to zero whenever there is a break or a short in the transmission line. This device also permits the receiver to handle signals whose duration may be reduced intentionally to zero.
3. A retransmission circuit generates and supplies through an isolation relay a time duration signal which corresponds to and is in synchronism with the received signal.
4. Transmitted signals having various repetition rates, e.g., between 4 and 60 seconds, can be accommodated efficiently and without introducing intolerable errors.

BRIEF DESCRIPTION OF THE DRAWINGS

The preferred embodiment of the invention is described herein in detail with reference to the accompanying drawings in which.

DESCRIPTION OF PREFERRED EMBODIMENT

Figure 1:
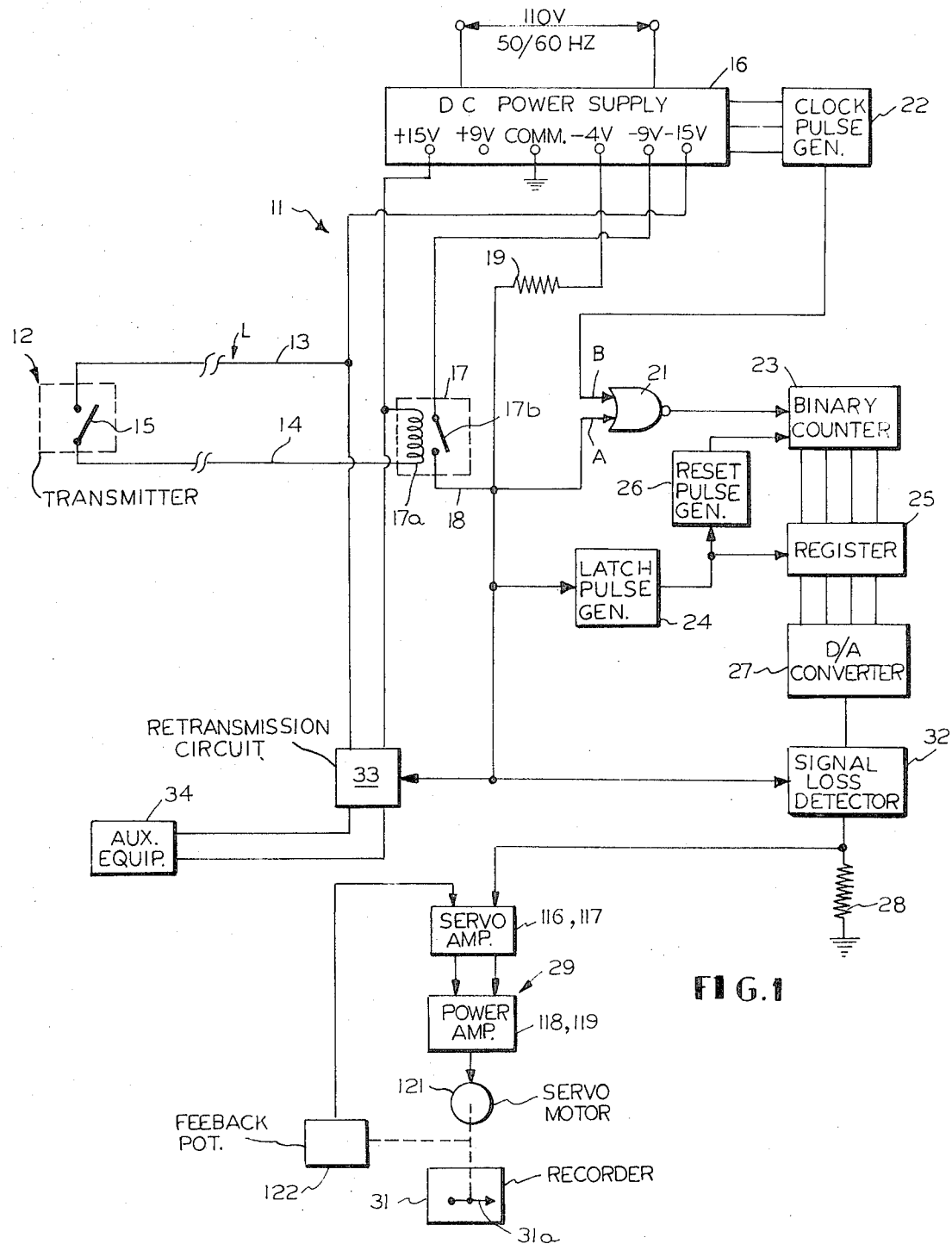
FIG. 1 is a simplified block diagram of the complete receiver.

Referring to FIG. 1, the improved receiver 11 is incorporated in a telemeter system including a transmitter 12, and a transmission line L containing a pair of conductors 13 and 14. The transmitter can take different forms, of which the one described in U.S. Pat. No. 2,111,678, granted Mar. 22, 1938, is an example, and for present purposes may be considered as a switch 15 which is closed periodically for a period of time whose length is a function of the variable to be transmitted. Commonly the on-off or transmission cycle is 4, 8, 15, or 60 seconds, and the maximum duration of the transmitted signal is eight-ninths of the total cycle. As explained later, the receiver 11 is capable of handling these four specific repetition rates as well as any others between 4 and 60 seconds. The transmitter 12 may include a power supply for switch 15, but the illustrated transmitter is of the "dry" type, and the 30 volts required for signal transmission is taken from the DC power supply 16 of receiver 11.

The receiver 11 is joined to the transmission line L through an isolation relay 17 whose coil 17a is connected in a circuit including the plus and minus 15 volt terminals of power supply 16, and the transmitter switch 15. The normally open contact 17b of this relay is connected with the −9 volt terminal of power supply 16 and is provided with an output connection 18 which is joined to the −4 volt terminal through an isolation resistor 19. Thus, connection 18 will be subjected to −9 volts when a transmitted signal is being received, and to −4 volts in the intervals between such signals. These voltage levels are used in the logic circuits of the receiver to represent the bits "0" and "1," respectively. The voltage at connection 18 is employed as the A input of a NOR gate 21 whose other input B is supplied with clock pulses which are referenced to the −9 volt level and are produced by generator 22. Since a NOR gate has a binary "1" output only when both inputs are "0," it follows that gate 21 conveys the clock pulses to counter 23 only during the time that relay contact 17b is closed. Therefore, the number in counter 23 will correspond to the pulse width of the transmitted signal.

At the end of the transmitted signal, contact 17b will open, and the voltage at connection 18 will become more positive. This change is sensed by a generator 24 which responds by supplying a latch pulse to memory register 25. This effects transfer of the count from counter 23 to the register. The latch pulse also triggers a reset pulse generator 26 which resets the counter 23 to zero after transfer of the count has been completed.

The binary count in register 25 is transduced to a proportional electrical current in digital-to-analog converter 27, and this current is then passed through a load resistor 28. The control voltage developed across resistor 28 serves as the input to a DC positioner 29 which positions the readout element, in this case the pen 31a of recorder 31.

The count stored in register 25 remains unchanged until counter 23 presents it with a different count at the time a subsequent latch pulse is received. Therefore, if there is a short or a break in transmission line L, pen 31a will remain in its last commanded position. In order to guard against this, the receiver 11 includes a signal loss detector 32 which is responsive to changes in the voltage at the output connection 18 of relay 17 and controls the passage of current through load resistor 28. The arrangement is such that current flow is interrupted in the event the voltage at connection 18 remains constant for a period, e.g., 2 to 2½ minutes, sufficiently longer than the longest transmission cycle to indicate a malfunction. This effect, of course, reduces to zero the voltage across resistor 28, and causes positioner 29 to move pen 31a to the zero position. The pen will remain in that position until transmission resumes.

As far as the basic receiver elements 21, 23, 25 and 27 are concerned, a transmitted signal of zero duration is indistinguishable from the unintentional absence of a signal. Therefore, in applications where the receiver is required to handle signals whose durations may be reduced to zero, detector 32 performs the vital zero value-transducing role as well as the auxiliary function mentioned above.

Sometimes it is required that the transmitted signal be relayed to a more remote receiver or be used to operate a totalizer or other voltage keyed instruments at the receiver station. Accordingly, the preferred receiver 11 includes a retransmission circuit 33 which is triggered by the voltage changes at connection 18 and which serves to transmit to the auxiliary apparatus 34 voltage pulses of the same magnitude as, and in synchronism with, those received by relay 17.

The foregoing general discussion provides the background for the following detailed descriptions of the major subcircuits of the receiver:

a. Power Supply And Clock Pulse Generator

Figure 2:
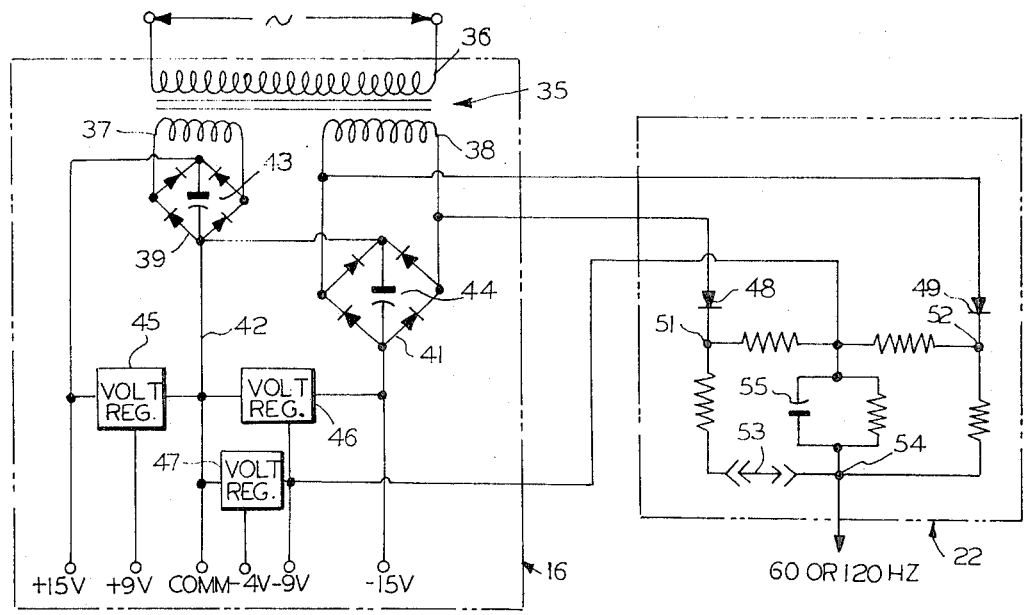
FIG. 2 is a schematic wiring diagram of the DC power supply and the clock pulse generator.

As shown in FIG. 2, power supply 16 includes a step-down transformer 35 having a primary 36 to which line voltage is applied, and two secondaries 37 and 38. The AC outputs of the two secondaries are rectified by diode bridges 39 and 41, respectively, to produce unregulated plus and minus 15 volts DC with respect to common connection 42. These voltages, which are smoothed by capacitors 43 and 44, respectively, provide the signal power for transmitter 12 and retransmission circuit 33, and also supply the power required by the power amplifier in DC positioner 29 and the 9-volt regulators mentioned below.

The unregulated +15 volt power is supplied to a voltage regulator 45, e.g., a zener diode, which produces the +9 volt $V_{cc}$ required by the servo amplifiers in positioner 29. The unregulated −15 volt power, on the other hand, is supplied to an active regulator 46, e.g., an operational amplifier regulator, which furnishes a well regulated −9 volts which serves as the −$V_{cc}$ of the servo amplifiers and as a reference voltage common for the gating, counting, registering, converting and feedback circuits. The −9 volt line also supplies a second active voltage regulator 47 which furnishes a well regulated −4 volts (i.e., +5 volts with respect to the −9 volt connection) which is used as the +$V_{cc}$ for the gating, counting, registering and converting circuits.

It should be noted here that the DC output voltages of power supply 16 are referenced to the common 42, and that the ground symbol is used in the drawings to indicate a connection to power supply common 42.

It might also be mentioned that the preferred receiver uses negative voltages for both logic levels because both the 5-volt regulator 47 and the feedback circuit of positioner 29 must be supplied by an active regulator. If positive logic voltages were employed (i.e., if regulator 47 were connected between the +9 volt output and common 42), both of the regulators 45 and 46 would have to be of the active type.

The secondary 38 of power supply transformer 35 also furnishes 50/60 Hz AC to clock pulse generator 22 where it is full wave rectified by diodes 48 and 49. The diodes produce positive pulses at the junctions 51 and 52 which are referenced to the −9 volt level and are 180° out of phase with each other. These pulses are combined through a jumper 53 to produce at output 54 clock pulses at a frequency of 100 or 120 Hz. A capacitor 55 serves as a filter which eliminates noise pulses which might otherwise be present at output 54. In cases where receiver 11 is coupled to a transmitter 12 using a 60 second cycle, jumper 53 is removed to thereby reduce the output frequency of generator 22 to 50/60 Hz. In this way, the long transmission cycle can be accommodated without unduly increasing the number of stages in counter 23, register 25, and converter 27.

b. Clock Gate And Latch And Reset Pulse Generators

Figure 3:
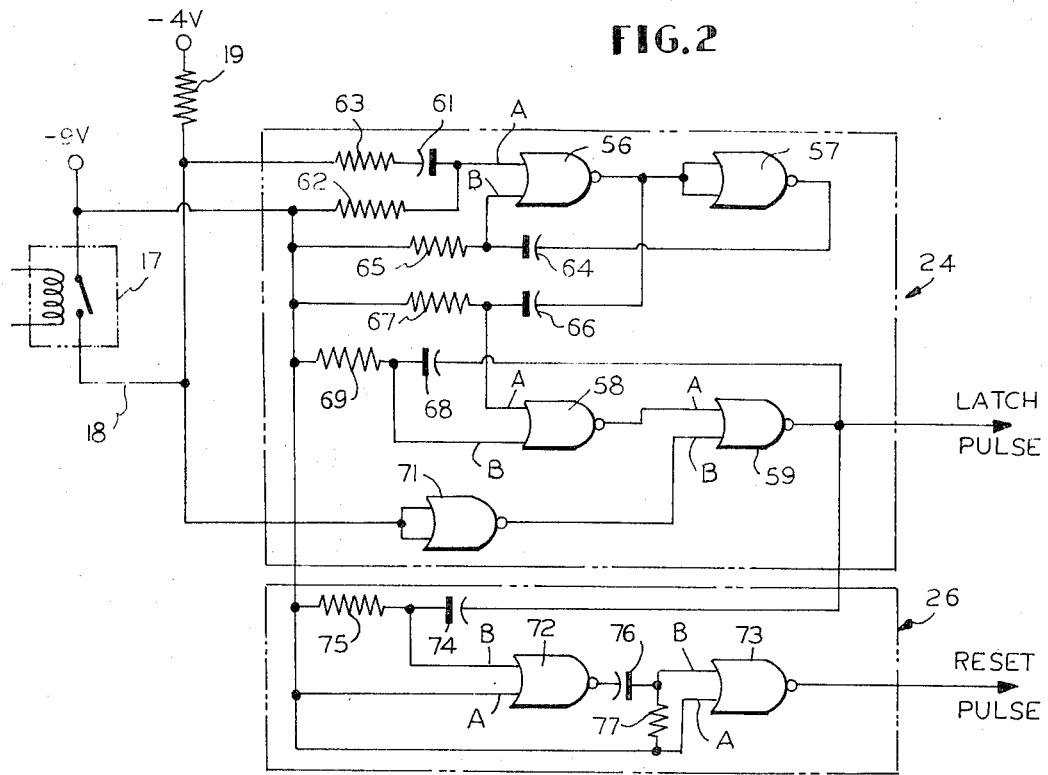
FIG. 3 is a schematic wiring diagram of the signal portions of the latch pulse and reset pulse generators.
Figure 4:
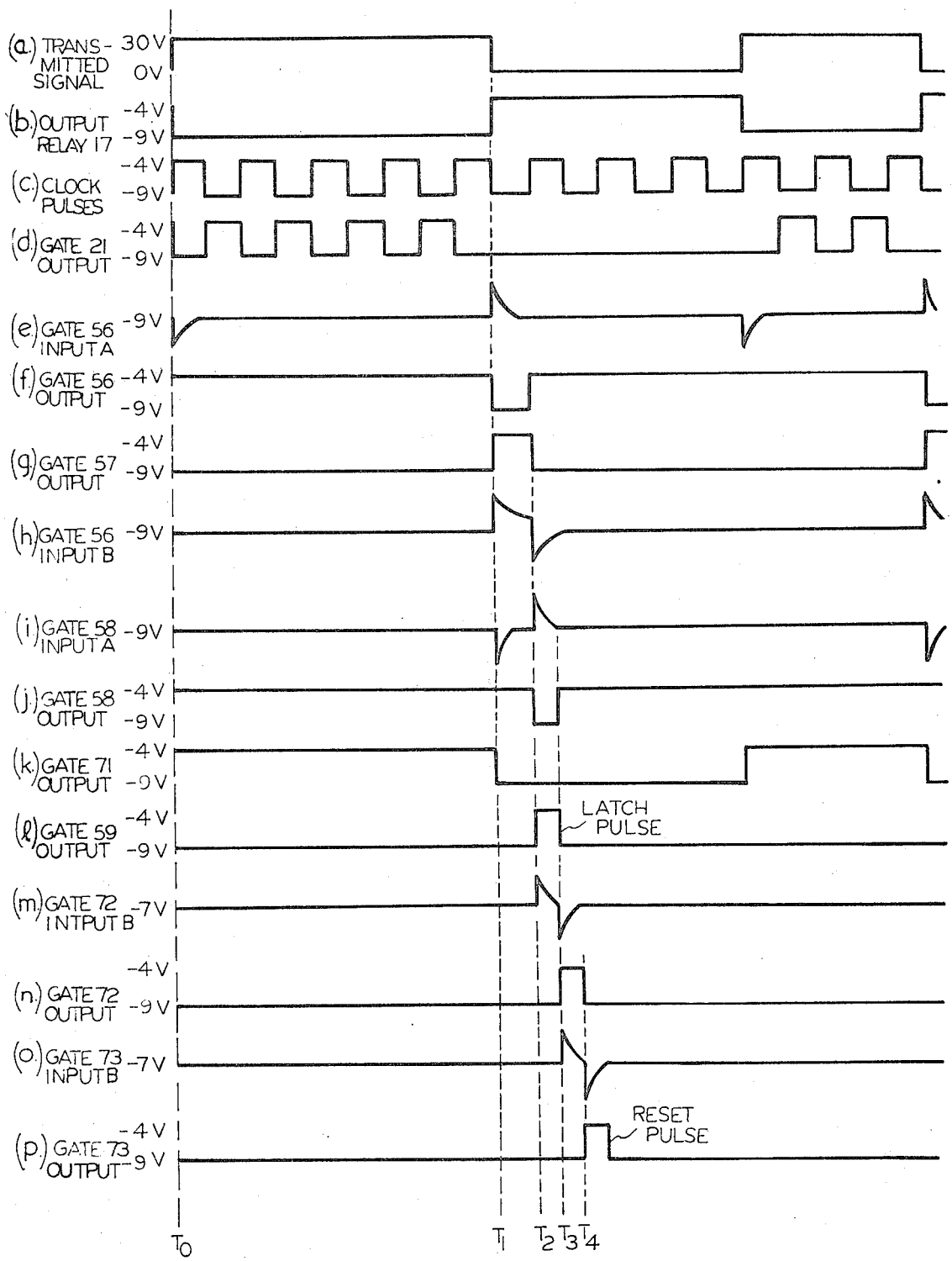
FIG. 4 is a graph showing the wave forms at various points in the receiver circuits.

This description concerns primarily the circuits shown in FIG. 3 and is supplemented by the wave forms depicted in FIG. 4. It is based upon the assumption that each NOR gate input which is connected to −9 volts through a resistance of 1,000 ohms or more is biased to a binary "1," and that a similar connection through a smaller resistor biases the input to binary "0."

As mentioned earlier, the clock pulses produced by generator 22 are passed to counter 23 through NOR gate 21 in accordance with the voltage level at relay output connection 18. During a transmitted pulse (wave form a, $T_0$ to $T_1$), relay 17 is energized; and the voltage at connection 18 (wave form b) is at the −9 volt level. Therefore, the clock pulses (wave form c) delivered to the input B of gate 21 will pass to counter 23 as indicated by wave form d. At the end of the transmitted signal (i.e., time $T_1$), relay 17 will be de-energized, contact 17b will open, and the voltage at connection 18 will rise to −4 volts. Since gate 21 can have a binary "1" output only when both inputs are at the binary "0" level, the supply of clock pulses to counter 23 now ceases. Inasmuch as the gate passes clock pulses only for a period of time equal to the duration of the transmitted signal, it follows that the number of pulses passed to the counter will be proportional to the width of the transmitted signal.

The trailing edge of the transmitted signal also causes latch pulse generator 24 to supply a latch pulse to register 25. As shown in FIG. 3, the generator includes four NOR gates 56–59 connected to form a pair of one-shot multivibrators. The input A of gate 56 is provided with a differentiating network composed of capacitor 61 and resistor 62 and to which the voltage at connection 18 is applied via isolating resistor 63. Input B, on the other hand, is equipped with a differentiating network which is composed of capacitor 64 and resistor 65 and is supplied with the output of gate 57. Resistors 62 and 65 have values less than 1000 ohms; therefore, since capacitors do not pass DC signals, both inputs of gate 56 will be at the binary "0" level except when AC signals are supplied to the associated differentiators.

When the leading edge of the transmitted pulse is received, the voltage at input A will decrease from −9 volts to a more negative level (see wave form $e$, time $T_0$), but this produces no output from the gate (see wave form $f$) because both inputs are already biased to the binary "0" level. On the other hand, at the end of the transmitted pulse (i.e., time $T_1$), input A of gate 56 will receive a positive-going voltage spike which raises its voltage to the binary "1" level. Gate 56 now supplies a negative pulse to the inputs of gate 57, and this causes the latter to produce a positive output pulse (see wave form $g$). This pulse is coupled through network 64, 65 to the B input of gate 56, thereby providing that input with a positive voltage spike which raises its voltage to a binary "1" level (see wave form $h$). Network 64, 65 has a longer time constant than network 61, 62, so input B will remain at the binary "1" level for a longer time than input A, and it will determine the width $T_2-T_1$ of the output pulse of gate 56. The time constant of network 64, 65 is selected so that input B will not return to the binary "0" level for about 60 milliseconds. With this arrangement, any contact bounce at either transmitter 12 or relay 17 will be masked and prevented from causing erratic operation of the generator 24.

The output of gate 56 is differentiated by a network comprising capacitor 66 and resistor 67 and then supplied to the A input of gate 58 (see wave form $i$). The other input B of this gate is provided with a differentiator composed of elements 68 and 69 and connected to receive the output of gate 59. As in the case of gate 56, the resistors 67 and 69 associated with the gate 58 are so sized that both of its inputs are biased to the binary "0" level. Thus, input A must receive a positive-going pulse from gate 56 in order to produce an output pulse. This occurs at time $T_2$, when the output voltage of gate 56 rises from −9 to −4 volts, and results in the production of the negative pulse shown by wave form $j$ which is supplied to the A input of gate 59. The other input B of gate 59 receives the output (wave form $k$) of an inverting NOR gate 71 whose inputs are connected with relay output 18. Therefore, gate 59 can produce an output pulse (see wave form $l$) only when the output of gate 71 is at the binary "0" level, and this occurs when relay 17 is de-energized and connection 18 is at the −4 volt level. The conditional response of the multivibrator defined by gates 58 and 59 is a desirable feature because it prevents gate 59 from generating a spurious latch pulse in cases where contact bounce at the commencement of a transmitted signal causes gate 56 to produce an output pulse.

It should be noted here that the circuit of generator 24 inherently provides a time delay $T_2-T_1$ between the production of the latch pulse and the trailing edge of the transmitted pulse. This delay insures that the count is complete before it is transferred to the memory register.

The reset pulse generator 26 comprises two NOR gates 72 and 73 whose A inputs are tied directly to the −9 volt reference line. Therefore, these gates serve as inverters with respect to the signals at their B inputs. The B inputs are equipped with differentiators 74, 75 and 76, 77, respectively, and the resistance element 75 or 77 of each of these networks has a value greater than 1,000 ohms so that the inputs are biased to a binary "1" voltage level (e.g., −7 volts). The differentiating network 74, 75 is supplied with the output of gate 59 in latch pulse generator 24 and furnishes to the B input of gate 72 the voltage spikes of wave form $m$. The first spike, attributable to the leading edge of the latch pulse, merely causes the voltage at input B to become more positive, and thus produces no change in the output of gate 72. However, the trailing edge of the latch pulse drives input B to a binary "0" voltage level, thereby resulting in a positive output pulse (see wave form $n$) from gate 72. This pulse is delivered to the differentiating network 76, 77 which supplies successive positive and negative voltage spikes (see wave form $o$) to the B input of gate 73. As in the case of gate 72, the positive spike merely makes the voltage at input B more positive and has no effect upon gate output, but the negative spike drives the input to a binary "0" level and causes the gate to produce a positive output pulse (see wave form $p$). This pulse is used to reset the counter, and since it lags the latch pulse by the time interval $T_4-T_3$, the circuit insures that transfer of the count will be complete before reset of the counter 23 takes place.

c. Counter, Register And Converter Circuits

Figure 5:
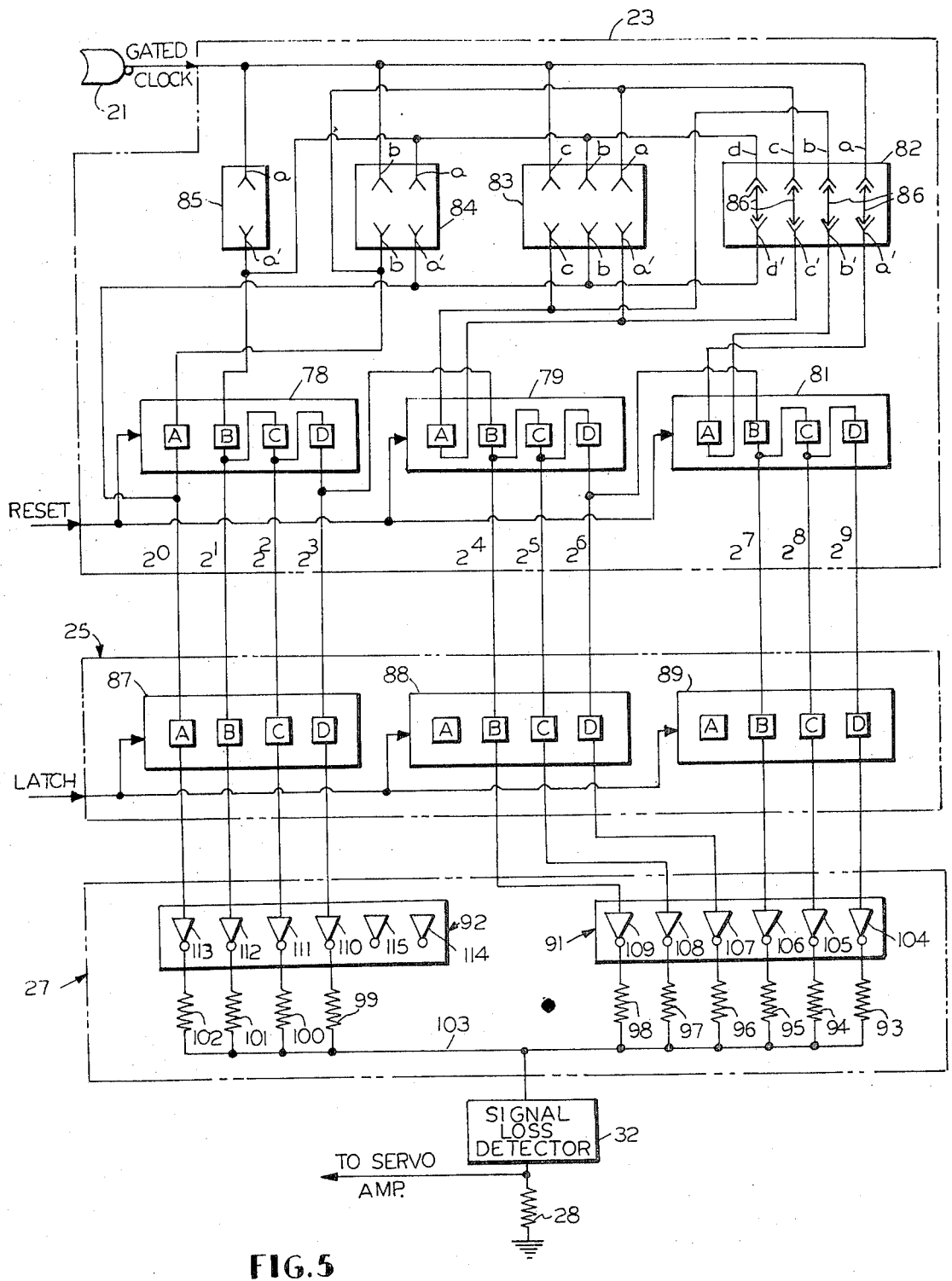
FIG. 5 is a schematic wiring diagram showing the signal paths of the counter, the register and the digital-to-analog converter.

Referring to FIG. 5, the counter 23 comprises three integrated circuits 78, 79 and 81, each of which contains four D-type flip-flops A, B, C and D and has reset capability. The A flip-flop of each integrated circuit is independent of the others and may be used either as a stage of the counter or as an independent divide-by-two multivibrator. As illustrated, flip-flop A of IC 78 serves as the least significant stage of the counter, and the A flip-flops of ICs 79 and 81 are used selectively as frequency dividers depending upon the length of the transmission cycle employed by transmitter 12. The receiver 11 is intended specifically to handle signals based on a 4, 8, 15 or 60 second transmission cycle, and counter 23 includes four sets of terminals 82–85 which are used with jumpers to establish the correct processing circuit for each cycle. The circuits are as follows:

1. 60 Second Cycle — For this mode of operation, the jumper 53 in generator 22 is removed to reduce clock pulse frequency to 50 or 60 Hz, and the lettered terminals of set 82 are connected with their prime counterparts by jumpers 86, The 50/60 Hz output of NOR gate 21 is applied to the A flip-flop of IC 81 via terminals $a$ and $a'$ to provide 25/30 Hz clock pulses, and these pulses in turn are applied to the A flip-flop of IC 79 via terminals $b$ and $b'$. The output of this flip-flop has a frequency of 12.5 or 15 Hz, and it is supplied through terminals $c$ and $c'$ of set 82 to the A flip-flop of IC 78. This is the least significant stage of the counter, and it is connected with the next stage, i.e., the B flip-flop of IC 78, through terminals $d$ and $d'$ of set 82. The counter has ten stages so it can accommodate a count of $2^{10}-1$ or 1,023; however, since the maximum duration of the transmitted signal usually is eight-ninths of the cycle, the counter actually accommodates only 800 pulses for a 60 Hz line input (i.e., 8/9 × 60 seconds × 15 Hz). This 100 percent signal gives a binary count of 1100100000, so the outputs of stages D and C of IC 81 and the output of stage D of IC 79 will be at the binary "1" voltage level of −4 volts, and the outputs of the other counting stages will be at the binary "0" voltage level of −9 volts.

2. 15 Second Cycle — In this case, jumper 53 is installed in generator 22 to give a clock pulse frequency of 100 or 120 Hz, and the terminals of set 83 are interconnected by jumpers. Now, the output of NOR gate 21 is applied through terminals $c$ and $c'$ of set 83 to the A flip-flop of IC 79, where its frequency is reduced to 50/60 Hz, and is then conveyed to the A flip-flop of IC 78 through terminals $a$ and $a'$. The output of this stage is applied to the $2^1$ stage through terminals $b$ and $b'$ of set 83. With this mode of operation, a 100 percent signal also requires a count of 800 (i.e., 8/9 × 15 seconds × 60 Hz) for the 60 Hz line input.

3. 8 Second Cycle — For this mode of operation, the generator 22 supplies 100/120 Hz clock pulses, and jumpers are used to interconnect the terminals of set 84. Thus, the clock pulses are applied directly to the A flip-flop of IC 78 through terminals $b$ and $b'$, and the output of this stage is coupled to the next counting stage through terminals $a$ and $a'$. In this case, the 100 percent signal for a 60 Hz line frequency requires counting of 854 pulses (i.e., 8/9 × 8 seconds × 120 Hz), and produces a binary count of 1101010110. Therefore, an output of −4 volts is obtained from the D and C flip-flops of IC 81, the D and B flip-flops of IC 79, and the B and C flip-flops of IC 78, and an output of −9 volts is obtained from the remaining four counting stages.

4. 4 Second Cycle — This mode of operation requires a 100/120 Hz output from generator 22 and use of a jumper to interconnect the terminals of set 85. In contrast to the three previous modes, the clock pulses here are applied to the $2^1$ counting stage (i.e., the B flip-flop of IC 78). This measure shifts the binary count to the next significant stage and thus has the effect of doubling the count. Thus, when using a 60 Hz line frequency, the count for a 100 percent signal will be 854 (i.e., 8/9 × 4 seconds × 120 Hz × 2), which is the same as in the case of the 8 second cycle.

The fact that the maximum counts for the four specified transmission cycles differ very little from each other permits use of common readout equipment without sacrificing resolution. The preferred receiver 11 also can accommodate other transmission cycles between 4 and 60 seconds, but the non-standard cycles usually require a slight modification in the DC positioner 29.

The memory register 25 is composed of three integrated circuits 87–89, each of which contains four conditional, D-type flip-flops A, B, C and D. Each of these flip-flops is connected to one of the counting flip-flops in counter 23, and, when the latch pulse is applied to the memory ICs, the outputs of their flip-flops will change as needed to correspond to the outputs of the associated counter flip-flops. The outputs of the memory flip-flops can change only during the short time that the latch pulse is being applied; therefore, the count stored in register 25 will not be altered when counter 23 is reset to zero.

It should be noted here that, while the memory ICs 87–89 afford 12 storage stages, the A flip-flops of ICs 88 and 89 are not normally utilized because only 10 of the 12 potential stages of counter 23 are actually used for counting.

The count stored in register 25 is transduced to a proportional electric current by digital-to-analog converter 27 which comprises two hexinverters 91 and 92, and a resistor ladder containing 10 resistors 93–102. At one end, each ladder resistor is connected to a conductor 103 which is joined to the common connection 42 of power supply 16 through signal loss detector 32 and load resistor 28, and at its other end each resistor is connected with the output of one of the amplifiers 104–113 in the two hexinverters. The converter 27 includes two additional inverting amplifiers 114 and 115 which appear as extra components in FIG. 5, but which actually are used in the circuit of signal loss detector 32 which is described later. Each of the inverting amplifiers 104–113 receives as its input the output of one of the stages of register 25, and serves to apply to the end of the associated ladder resistor either 0 volts (i.e., the voltage at power supply common 42) or −8 volts depending upon whether the memory stage output is at the −9 volt binary "0" level or the −4 volt binary "1" level. Therefore, current flow through each ladder resistor will occur only when the associated memory stage contains a binary "1."

The values of the ladder resistors 93-102 are related as $2^0:2^1:\ldots 2^9$, respectively, so that as the significances of the memory stages increase, the values of the associated resistors decrease. In other words, the particular value of a ladder resistor is proportional to $2^{9-x}$, where $x$ is the power of two which determines the significance of the related memory stage. In addition, the value of the smallest ladder resistor is made about 100 times the value of load resistor 28. With this arrangement, the current passing through load resistor 28 is, for all purposes, proportional to the count stored in register 25. An example will illustrate this point. Let it be assumed that the value of the smallest ladder resistor 93 is 1,000 ohms so that the two largest ladder resistor 102 and 101 have values of 512K ohms and 256K ohms, respectively, and load resistor has a value of about 10 ohms. Now, if the register 25 is storing a count of one, amplifier 113 will apply −8 volts to the upper end of resistor 102, and all of the other ladder resistors will be subjected to common potential. Since the effect on current of load resistor 28 can be neglected, the current through this resistor will depend only upon the value of resistor 102 and will be 15.6 microamps. If the stored count is then raised to two, the −8 volts will be applied only to resistor 101, and the output current will increase to 31.2 microamps (i.e., 8 volts divided by 256K ohms), or twice its previous value. For a stored count of three, the −8 volts is applied to both of the resistors 101 and 102, and as a result the analog current increases to 46.8 microamps, or three times the current for a count of one. The analog current will continue to increase in steps of 15.6 microamps as the count increases up to the maximum or 100 percent level for the transmission cycle being used; therefore, the current always will be proportional to the stored count. As mentioned earlier, this current develops a voltage across load resistor 28 which serves as the input to the DC positioner 29.

d. The DC Positioner

Figure 6:
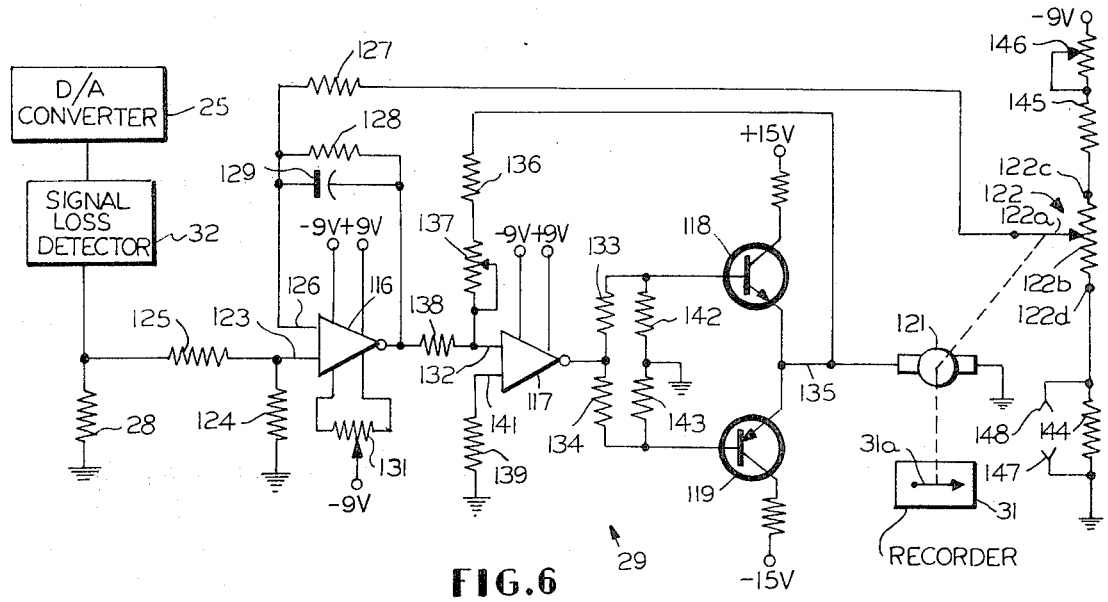
FIG. 6 is a schematic wiring diagram of the DC positioner.

Referring to FIG. 6, the servo positioner 29 includes a pair of servo amplifiers 116 and 117, a power amplifier comprising NPN transistor 118 and PNP transistor 119, a DC servo motor 121, and a feedback potentiometer 122 whose wiper 122a is positioned by motor 121. Servo amplifier 116 has a noninverting input 123 which is provided with an input-developing resistor 124 and an isolating resistor 125 and to which the control voltage developed across load resistor 28 is supplied, and an inverting input 126 which is connected with potentiometer wiper 122a through input resistor 127. A degenerative feedback path defined by resistor 128 and capacitor 129 prevents oscillation, and thus insures stable operation, and a trim potentiometer 131 counteracts any small difference between the amplifier input signals which exists under null conditions. The gain of amplifier 116 is determined by the ratio of the values of resistors 128 and 127 and normally would be about 10.

The DC output of amplifier 116 is proportional to the difference between the signals at inputs 123 and 126, and is positive or negative depending upon whether the voltage at input 123 is more positive or more negative than the voltage at input 126. This amplified error signal is supplied to the inverting input 132 of a second servo amplifier 117 wherein it is further amplified and inverted. The error signal is then delivered to the bases of power transistors 118 and 119 through the isolating resistors 133 and 134, respectively. The three amplifiers 117–119 are provided with a common degenerative feedback path leading from the output connection 135 of transistors 118 and 119 to the input connection 132 of amplifier 117 and containing fixed and variable resistors 136 and 137, respectively. The gain of amplifiers 117–119 depends upon the ratio of the sum of the values of feedback resistors 136 and 137 to the value of input resistor 138, and in a typical case can be varied between 100 and 300 by adjustment of resistor 137. The illustrated feedback path inherently compensates for variations in the base-to-emitter voltage drop in each power transistor, and thereby provides a stable gain and reduces deadband. Moreover, the inclusion of a gain adjustment allows optimum performance to be afforded even under the suppressed signal modes of operation discussed below. The resistor 139 in the connection between power supply common 42 and the noninverting input 141 of servo amplifier 117 affords temperature compensation, and the resistors 142 and 143 in the base circuits of power transistors 118 and 119 serve as signal-developing and bias resistors for these transistors.

When the input and feedback voltages applied to servo amplifier 116 are equal, the outputs of this amplifier and amplifier 117 will be zero, and both of the power transistors 118 and 119 will be turned off. As a result, motor 121 will be at rest, and positioner 29 will not alter the position of pen 31a. If the duration of the transmitted signal now increases, the voltage at input 123 will become negative relative to the voltage at input 126, and amplifier 116 will deliver a negative output voltage to amplifier 117. Amplifier 117 now produces a positive output voltage which causes NPN transistor 118 to become conductive and allow current to flow from the +15 volt terminal to power supply common through motor 121. As a result, the motor moves recorder pen 31a in the up-scale direction. Simultaneously, motor 121 drives potentiometer wiper 122a toward the terminal 122c of resistive element 122b, thereby making the voltage at input 126 more negative. When the input and feedback voltages at amplifier inputs 123 and 126 are again equal, motor 121 will stop. The distance pen 31a has been moved up-scale will correspond to the change in the duration of the transmitted signal.

If the duration of the transmitted signal should now decrease, the voltage at input 123 will become positive with respect to the voltage at input 126, and amplifier 116 will deliver a positive voltage to amplifier 117. This output is inverted to a negative voltage by amplifier 117, so now PNP transistor 119 becomes conductive and allows current to flow from the power supply common 42 to the −15 volt terminal through motor 121. Since this direction of current flow through the motor is the reverse of what it was in the preceding case, the motor now moves pen 31a in the down-scale direction. At the same time, motor 121 shifts potentiometer wiper 122a toward terminal 122d, and thereby makes more positive the feedback signal applied to input 126. As before, the input and feedback signals will be balanced, and motor 121 will come to rest, when the change in position of pen 31a matches the change in the duration of the transmitted signal.

In some applications, the input to transmitter 12 is controlled so that its possible range of variation is less than the full range which the transmitter is capable of transducing. These situations make desirable inclusion in the receiver of some means to permit full scale deflection of pen 31a regardless of the limits on the incoming signal, because this insures maximum readout resolution. The resistors 144 and 145 and the potentiometer 146 associated with feedback potentiometer 122 define such a means in the illustrated receiver. For normal applications, i.e., those in which the transmitted signal varies between zero and 100 percent, resistor 144 is either by-passed or replaced by a jumper between terminals 147 and 148 so that common potential is present at terminal 122d, and span potentiometer 146 is adjusted to provide at terminal 122c a voltage equal to the maximum value of the control voltage which is supplied to amplifier input 123. A similar procedure is followed in applications where the input to amplifier 116 varies only between zero and an intermediate level less than maximum, but in this case, of course, the voltage at terminal 122c is suppressed to a lower level. Situations of this kind can arise either as a result of the nature of the quantity being telemetered, or as a result of the fact that the transmitter uses a cycle other than one of the four specifically mentioned above. For example, if the transmitter has a 12 second cycle, counter 23 would be set for the 15 second cycle, and span potentiometer 146 would be adjusted to establish at terminal 122c a voltage equal to four-fifths that normally used for the 15 second cycle. In another type of application, the transmitted signal varies only between an intermediate level and the 100 percent level. Here, resistor 144 is used to suppress the zero point of potentiometer 122 by biasing the voltage at terminal 122d to the appropriate intermediate value, and, as before, span patentiometer 146 is set to establish the proper maximum voltage at terminal 122c.

It should be mentioned that, in any of the preceding cases, establishment of the required voltage at terminal 122c may be beyond the capacity of potentiometer 146. In this event, the value of resistor 145 must be changed. Although this step could be eliminated by increasing the electrical size of potentiometer 146, this expedient is not considered desirable because it would cause the voltage at 122c to change so rapidly with movement of the potentiometer wiper that proper adjustment would be very difficult.

e. Signal Loss Detector And Retransmission Circuit.

Figure 7:
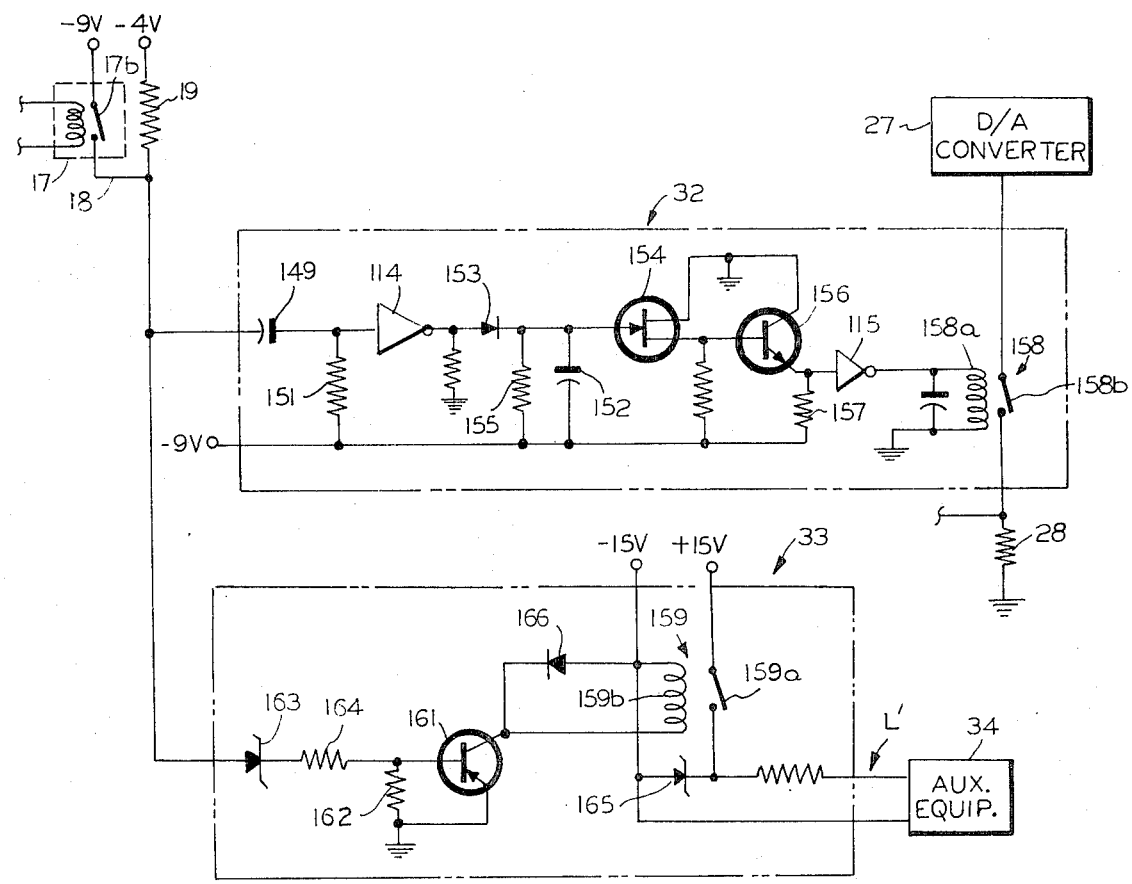
FIG. 7 is a schematic wiring diagram of the signal loss detector and the retransmission circuit.

As shown in FIG. 7, the signal loss detector 32 incorporates a differentiating network consisting of capacitor 149 and resistor 151 which applies voltage spikes to the input of inverting amplifier 114 each time the voltage at relay output connection 18 changes. These spikes are inverted by the amplifier and applied to capacitor 152 through a diode 153. Thus, when relay contact 17b closes upon receipt of the leading edge of the transmitted signal, and the voltage at connection 18 becomes more negative, amplifier 114 will produce a positive output spike, and capacitor 152 will charge. On the other hand, when relay contact 17b opens upon receipt of the trailing edge of the transmitted signal, amplifier 114 will produce a negative output spike, diode 153 will be reversed biased, and the charge on capacitor 152 will be unaffected. Capacitor 152 charges quickly through diode 153 and retains a charge sufficient to keep field effect transistor 154 conducting for a period determined by the value of the resistor 155 interposed in its discharge path. This period is longer than the longest transmission cycle which can be encountered, and, for the illustrated embodiment, is on the order of 2½ minutes. When FET 154 is conducting, NPN transistor 156 also will conduct; consequently, the voltage across capacitor 152 will appear across resistor 157. Inverting amplifier 115 amplifies this signal and applies it to the coil 158a of a relay 158 whose normally open contact 158b is in series with load resistor 28.

During normal operation, the relay 158 of detector 32 will be energized continuously, assuming that the transmitted signal has a value greater than zero, and as a result the analog current developed by converter 27 can flow through load resistor 28 and develop the control voltage which is transduced by DC positioner 29. On the other hand, if signal transmission is interrupted for a period of more than 2½ minutes, as a result either of a break or a short in transmission line L, capacitor 152 will discharge below the sustaining level of FET 154, and both this transistor and transistor 156 will cease conducting. The voltage at the input to amplifier 115 now becomes −9 volts, hence the output rises to 0 volts (i.e., the voltage at power supply common 42). Therefore, relay 158 de-energizes to open contact 158b and interrupt current flow through resistor 28. Since this action reduces the control voltage to zero, positioner 29 now moves recorder pen 31a to the zero position. The pen will remain in this position until transmission is restored.

It should be mentioned here that, since a transmitted signal of zero duration will not cause generator 24 to produce a latch pulse, the count stored in register 25 can never be reduced to zero. Therefore, receiver 11 can not transduce zero signals into zero positions of pen 31a in the normal manner described herein. However, if the zero signal persists for more than 2½ minutes, detector 32 will open contact 158b and thereby effect movement of pen 31a to zero position in the same way as when an unintentional loss of signal occurs. Thus, the inclusion of the detector allows receiver 11 to be used in applications where the duration of the transmitted signal may reduce to zero.

The retransmission circuit 33, which also is depicted in FIG. 7, includes a relay 159 having a normally open contact 159a which controls current flow through a circuit extending between the plus and minus 15 volt terminals of power supply 16 and containing the auxiliary equipment 34. The coil 159b of the relay is connected in a circuit extending between the −15 volt terminal and common connection 42 and which is controlled by PNP transistor 161. The base of this transistor is connected with power supply common 42 through resistor 162, and is connected with the output connection 18 of relay 17 via zener diode 163 and current-limiting resistor 164. The diode 163 has a breakdown voltage intermediate the two voltage levels which are established at connection 18, and therefore it conducts only during the time that a transmitted pulse is being received (i.e., only when connection 18 is at the −9 volt level). When zener diode 163 conducts, the voltage at the base of transistor 161 becomes negative with respect to the voltage at the emitter, and the transistor conducts. As a result, relay 159 is energized, and its contact 159a closes to complete the 30 volt circuit through auxiliary equipment 34. On the other hand, when diode 163 is nonconductive, the base and emitter of transistor 161 are subjected to equal voltages, and the transistor becomes nonconductive. In this case, relay 159 is de-energized, and its contact 159a opens the 30 volt circuit to unit 34. The zener diode 165 is included in circuit 33 to protect its components from voltage surges that might be applied to the retransmission line L', and a blocking diode 166 is included to suppress transients which adversely affect transistor 161.

I claim:

1. A telemetric receiver for transmitted signals having modulated widths comprising
   a. a clock pulse generator (22);
   b. a binary counter (23) capable of being reset to zero by a reset pulse:
   c. a binary memory register (25) connected with the counter and serving, upon receipt of a latch pulse, to store the count present in the counter;
   d. means (21) for delivering clock pulses to the counter during a time interval corresponding to the width of the transmitted signal;
   e. a latch pulse generator (24) effective at the end of each transmitted pulse to supply a latch pulse to the register and effect transfer thereto of the count in the counter;
   f. a reset pulse generator (26) effective to supply a reset pulse to the counter after the count therein has been transferred to the register; and
   g. digital-to-analog converting means (27) for establishing a variable control current whose magnitude is proportional to the count stored in the register.

2. A telemetric receiver as defined in claim 1 in which the converting means (27) includes a group of ladder resistors (93–102) each of which is connected at one end with one stage of the register (25) and the opposite ends of which are joined by a common conductor (103), the value of each resistor being proportional to $2^{n-x}$, where n is the number of register stages, and x is the exponent of 2 which determines the positional value of the associated register stage.

3. A telemetric receiver as defined in claim 2 in which
   a. the converting means (27) also includes an amplifier (104-113) interposed between each register stage and the associated resistor; and
   b. including a load resistor (28) connected between said common conductor and a source (42) of constant potential and having a value on the order of one one-hundredth of the value of the smallest ladder resistor,
   c. each amplifier serving to apply to the associated ladder resistor either a voltage equal to said constant voltage or a predetermined different voltage depending upon which binary digit is stored in the associated register stage.

4. A telemetric receiver as defined in claim 1 including a signal loss detector (32) for automatically changing the magnitude of said control current to a predetermined level independent of the count stored in the register whenever the time interval between transmitted signals exceeds a predetermined duration.

5. A telemetric receiver as defined in claim 4 in which the signal loss detector (32) comprises
   a. means, including a differentiator (149,151), for producing voltage spikes of opposite polarities at the leading and trailing ends of each transmitted signal;
   b. a capacitor (152) connected to be charged by only one set of said spikes;
   c. a resistor (155) connected to provide a discharge path for the capacitor, the time constant provided by the resistor and capacitor being selected to cause the capacitor to discharge to a preselected level in said predetermined duration; and
   d. means (115,154,156,158) responsive to the charge on the capacitor for reducing the control current to zero whenever the charge on the capacitor is at or below said preselected level.

6. A telemetric receiver as defined in claim 5 in which
   a. the capacitor (152) is connected with the differentiator through a blocking diode (153); and
   b. the means responsive to capacitor charge includes an amplifier (115) and a relay (158) which is energized by the output of the amplifier.

7. A telemetric receiver as defined in claim 1 including
   a. a DC power supply (16); and
   b. a retransmission circuit (33) connected to receive power from said power supply and to create therefrom output signals which correspond to and are synchronized with the transmitted signals.

8. A telemetric receiver as defined in claim 7 in which the retransmission circuit comprises
   a. a subcircuit containing a zener diode (163) and a load resistor (162);
   b. means (16-18) for applying across said subcircuit a DC voltage which is greater than the breakdown voltage of the zener diode when a transmitted signal is being received and which is less than the breakdown voltage in the interval between transmitted signals, whereby a voltage is developed across the load resistor only during the time a transmitted signal is being received;
   c. a relay (159) including a normally open contact (159a) which selectively connects said DC power supply in a circuit with a pair of output lines ($L^1$); and
   d. an amplifier (161) controlled by the voltage developed across the load resistor and arranged to energize the relay.

9. A telemetric receiver as defined in claim 1 including means for changing the frequency of the clock pulses delivered to the counting stages of the counter.

10. A telemetric receiver as defined in claim 9 in which the means for changing frequency comprises at least one flip-flop frequency divider (79-A or 81-A) which may be selectively interposed in or removed from the path interconnecting the clock pulse generator and the counting stages of the binary counter.

11. A telemetric receiver as defined in claim 1 in which
    a. the clock pulse generator (22) includes a rectifier connected with an AC source and having two half-wave rectifying sections (48,49); and
    b. the clock pulse generator has connections (53) which permit the output of one section or the combined outputs of both sections to be used as the clock pulses.

12. A telemetric receiver as defined in claim 11 including
    a. a pair of flip-flop frequency dividers (79-A,81-A); and
    b. connections (82-85) which permit the clock pulses to be supplied to the counting stages of the counter through a selected one of three paths, namely a direct path which includes neither flip-flop, a second path which includes only one flip-flop, and a third path which includes both flip-flops in series.

13. A telemetric receiver as defined in claim 12 including connections which permit the clock pulses to be delivered selectively to either the least significant stage or to the next more significant stage of the counter.

14. A telemetric receiver as defined in claim 1 including
    a. a readout element (31a) for displaying the information represented by the widths of the transmitted signals;
    b. a load resistor (28) connected to be traversed by the control current and to develop a control voltage; and
    c. a servo system (29) which responds to the control voltage and positions the readout element in accordance therewith.

15. A telemetric receiver as defined in claim 14 in which the servo system includes
    a. a reversible DC servo motor (121) for positioning the readout element (31a);
    b. a potentiometer (122) having a wiper (122a) which is positioned by the servo motor and serving to produce a feedback voltage which corresponds to the position of the readout element;
    c. a first servo amplifier (116) connected to receive the feedback and control voltages and to produce an output whose magnitude is proportional to the difference between said voltages and whose polarity depends upon the relative magnitudes of the two voltages;
d. a second servo amplifier (117) connected to amplify the output of the first servo amplifier;
e. a power amplifier (118, 119) connected to receive the output of the second servo amplifier and to furnish to the servo motor a proportional drive voltage whose polarity is determined by the polarity of said output;
f. a degenerative feedback path extending from the output of the power amplifier to the input of the second servo amplifier and containing an adjustable gain resistor (127); and
g. resistance means (144-146) in series with the resistive element of the potentiometer (122) and sized to cause the servo motor to move the indicator full scale for a predetermined change in said control voltage.

16. A telemetric receiver as defined in claim 1 which includes
a. a DC power supply (16) which produces regulated voltages of two levels; and
b. means connected with the power supply, and including a line isolation relay (17) which is energized by the transmitted signals, for establishing a logic voltage in an output circuit (18) which corresponds to one of said regulated levels when a transmitted signal is being received and corresponds to the other of said levels in the time interval between transmitted signals;
and in which
1. the means for delivering clock pulses to the counter comprises a logic gate (21) having a pair of inputs (A,B) connected to receive the clock pulses and the logic voltage and serving to pass clock pulses to the counter (23) only when the logic voltage is at said one level;
2. the latch pulse generator (24) is triggered by a change in the logic voltage from said one level to said other level; and
3. the reset pulse generator (26) is triggered to supply a pulse to the counter by the trailing end of the latch pulse.

17. A telemetric receiver as defined in claim 16 in which both regulated voltage levels are negative, and said one level is the more negative.

* * * * *